April 19, 1938.  T. G. CRIDER  2,114,761
AIR TREATING APPARATUS
Filed April 11, 1935
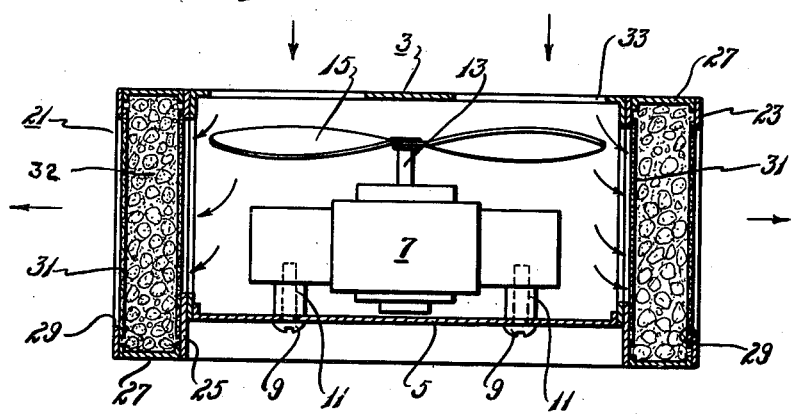
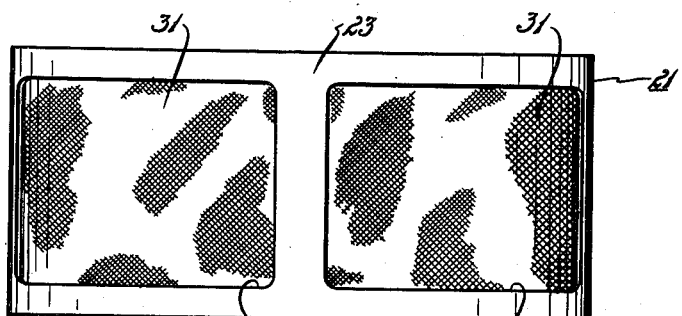
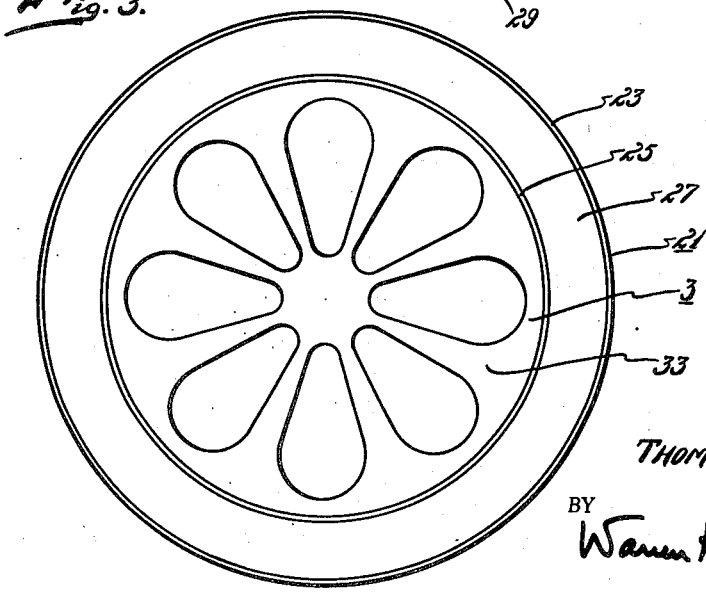
INVENTOR.
THOMAS G. CRIDER
BY
ATTORNEY.

Patented Apr. 19, 1938

2,114,761

UNITED STATES PATENT OFFICE 2,114,761

AIR TREATING APPARATUS

Thomas G. Crider, Detroit, Mich., assignor, by mesne assignments, to Nash-Kelvinator Corporation, Detroit, Mich., a corporation of Maryland Application April 11, 1935, Serial No. 15,843

2 Claims. (Cl. 183—36)

My invention pertains to air filtering apparatus and more particularly to a rechargeable unitary device for filtering or deodorizing air or other gases, and a filter cartridge therefor.

It is an object of my invention to provide a simple compact air filter or deodorizing device which presents a very large effective air treating area and distributes the filtered air uniformly in all directions comprising an annular casing constructed of perforated concentrically spaced side walls which are adapted to support a gas treating or deodorizing material and which is slidable in snug fitting relation over a cylindrical housing which encloses a motor driven fan for drawing air in through the open end of the housing and blowing it out through the side walls which are also perforated.

It is a further object of my invention to provide quick changeable filter or deodorizing cartridge of annular formation adapted to be conveniently disposed around a cylindrical air circulating device to expose the greatest possible air treating surface of the enclosed material.

The invention itself, however, both as to its organization and its method of operation, together with additional objects and advantages thereof, will best be understood from the following description of a specific embodiment, when read in conjunction with the accompanying drawing, in which:

Fig. 1 is a cross-sectional view through an embodiment of my air treating device; and Figs. 2 and 3 are side and end elevational views respectively.

Referring more specifically to Fig. 1 of the drawing my device comprises a cylindrical housing 3 which is open at its upper end. The lower end of the housing is closed by an end wall 5 on which an electric motor 7 is secured by screws or bolts 9 passing through suitable spacers 11 into the frame of the motor. The shaft 13 of the motor is disposed in aligned relation with the axis of the cylindrical housing, and the upper end thereof projects toward the open end of the housing. A gas deflecting fan 15 is operatively secured upon the upper extended end of the shaft 3, and the side walls of the enclosing housing 3 are perforated to provide for the free circulation of air therethrough by the fan.

In operation the motor 7 drives the fan 15 in such a direction that the surrounding air or gas is drawn into the housing 3 through the open end, as indicated by the adjacent arrows, setting up a pressure therein whereby the surrounding gas which is drawn into the housing is forced out through the perforations in the enclosing sidewalls.

To support a large area of odor absorbent or filtering material in intimate association with the gas which is forced through the perforated side walls of the housing, I provide an annular casing 21 comprising perforated, concentrically spaced side walls 23 and 25, which are supported in spaced relation by suitable annular end rings 27 which may be secured thereto in any suitable manner as by welding. Both the inner and outer walls of the annular casing may be provided with small perforations in any suitable manner, but I prefer to provide a perforated structure comprising relatively large apertures 29 in the side walls covered by a relatively fine foraminous screen 31 which may be of wire or other material on the inside thereof. The charcoal 32 or filtering material is charged in the annular casing between the concentrical spaced side walls thereof. The inner wall 25 of the annular filter cartridge 21 is made of such diameter that it may be slidably placed in snug fitting relation around the side walls of the cylindrical housing 3. Any suitable material may be utilized as desired for deodorizing or filtering the gas, and it may be readily replaced by merely pulling the old casing off the blower housing 3 and sliding a new one thereon.

If a reactivatable material such as charcoal is utilized for deodorizing, the removed casing 21 may be subjected to suitable treatment for reactivating the material and driving off the odors and impurities which were absorbed therein, and the casing may thereafter be replaced upon the housing 3 for further use.

In use a perforated cover 33 is preferably placed over the open upper end of the cylindrical housing as shown in Fig. 3, to protect the air circulating fan. The electric fan driving motor may be energized from any convenient service outlet in a well known manner. It will be understood that my rechargeable cartridge may be charged with any filtering, deodorizing, fumigating, dehumidifying, or other gas treating material as desired.

It will be seen that I have provided a simple, compact, air treating unit which may be conveniently charged and recharged to present a maximum air treating surface to the treated gas or air which it distributes uniformly in all directions.

Although I have shown and described certain specific embodiments of my invention, I am fully aware that many modifications thereof are possible. My invention therefore is not to be restricted except insofar as necessitated by the prior art.

I claim as my invention:

1. The combination in an air treating unit of a cylindrical housing open at one end and closed at the other end, said cylindrical housing having perforated side walls, air circulating means therein for drawing air through the open end and expelling it through said perforate side walls and an annular filter cartridge comprising perforate concentrically spaced side walls the inner one of which is adapted to fit in slidable engagement over the side walls of said cylindrical housing, and air treating material supported between the walls of said filter cartridge.

2. In an air treating unit, the combination of a substantially cylindrical housing, said housing having perforated side walls, a wall disposed transversely of the housing adjacent one end thereof, an electrical motor supported on said wall, air deflecting means driven by said motor for drawing air through the open end of said housing and expelling it through the perforated side walls thereof, and an annular filter cartridge adapted to fit in slidable engagement over the perforated side walls of said cylindrical housing for filtering the air expelled therefrom.

THOMAS G. CRIDER.